Jan. 17, 1939.  T. ZUSCHLAG  2,144,476
MAGNETIC ANALYSIS
Filed April 14, 1937   3 Sheets-Sheet 1

Fig. 1,

INVENTOR
Theodor Zuschlag
BY
ATTORNEYS

Jan. 17, 1939.　　　　T. ZUSCHLAG　　　　2,144,476

MAGNETIC ANALYSIS

Filed April 14, 1937　　　　3 Sheets-Sheet 2

INVENTOR
*Theodor Zuschlag*
BY
*Janis Davis Marwans Edmonds*
ATTORNEYS

Jan. 17, 1939.  T. ZUSCHLAG  2,144,476
MAGNETIC ANALYSIS
Filed April 14, 1937   3 Sheets-Sheet 3
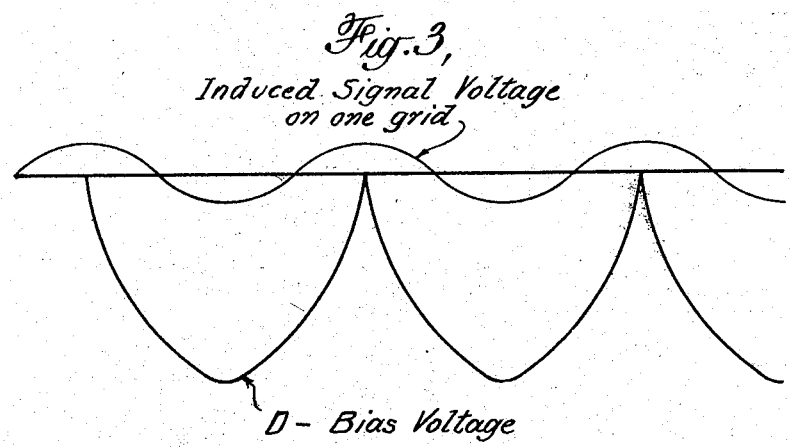
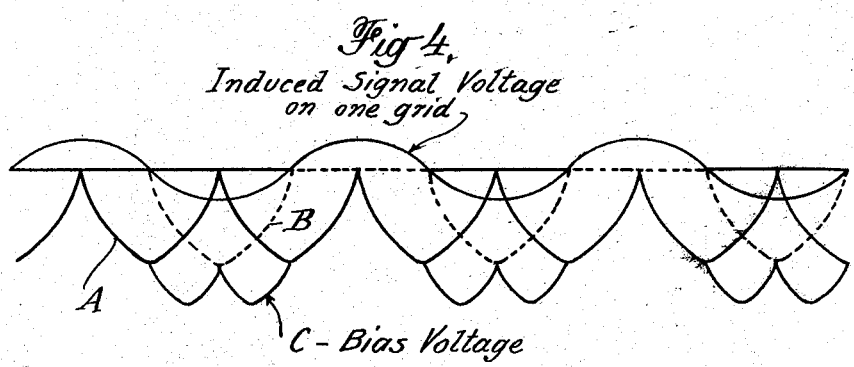
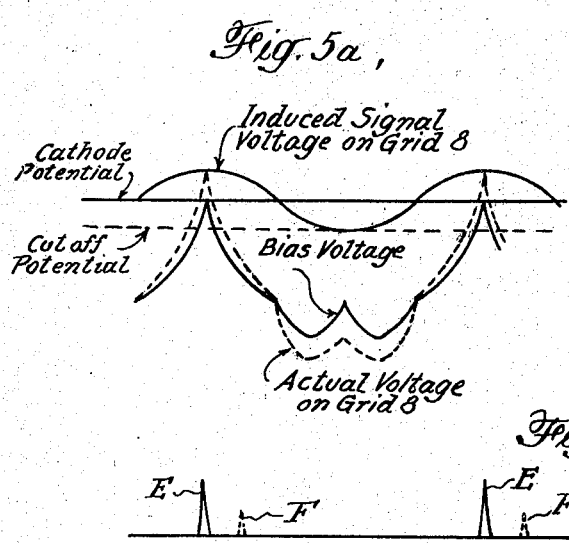
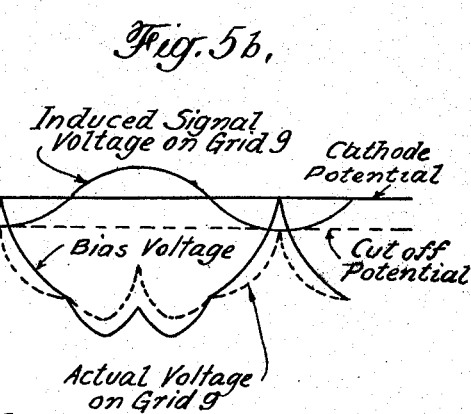
INVENTOR
Theodor Zuschlag
BY
Pennie, Davis, Marvin and Edmonds
ATTORNEYS Patented Jan. 17, 1939

2,144,476

UNITED STATES PATENT OFFICE 2,144,476

MAGNETIC ANALYSIS

Theodor Zuschlag, West Englewood, N. J., assignor to Magnetic Analysis Corporation, Long Island City, N. Y., a corporation of New York Application April 14, 1937, Serial No. 136,824

21 Claims. (Cl. 175—183)

This invention relates to magnetic analysis, and particularly to analysis of the magnetic properties of a magnetizable body in an electromagnetic field.

It is an object of the invention to increase the precision with which such a magnetic analysis may be made, and at the same time to reduce the cost and complexity of the required apparatus, both for laboratory investigations and for production test work, and to this end I provide a novel method and apparatus for determining the wave form of a voltage set up in a winding disposed in inductive relationship with the magnetizable body under test.

That relations exist between the metallurgical properties and the magnetic behavior of magnetizable bodies is known. Indeed, it is known that the magnetic behavior of such a body is one of the most sensitive and convenient indicators of its metallurgical properties, and various methods and means have therefore been devised for determination of said magnetic properties.

One of the heretofore customary methods of making such determinations involves placing a primary and a secondary winding upon the specimen as a magnetic core, so that they are electromagnetically coupled through the medium of the specimen. Alternating current is supplied to the primary winding, and the wave form of the resulting induced voltage in the secondary winding is determined. As is well known, the character of such wave form depends intimately on the magnetic properties of the core. This method is designated herein by the expression "induced voltage method".

To determine the wave form of the induced voltage, both the oscillograph and a so-called "point contact" method of wave-form determination have been employed. In the case of the oscillograph, the secondary voltage is supplied unchanged thereto, and the wave form appears upon its screen. In the case of the point contact method, the secondary voltage, or some current proportional thereto, is applied during successive brief time intervals to an appropriate measuring device, the intervals of application being spaced apart by one cycle, or 360 electrical degrees. In the past, this has been accomplished by means of a synchronously rotating contactor, and the phase at which the contact occurs is manually adjusted as desired. Successive readings of the measuring device are then plotted against the phase angles to which they correspond, as read from a dial on the synchronous contactor.

Each of these methods is open to serious objections. The oscillograph is an expensive and a delicate instrument, requiring skilled operators for its care and operation, and for the correct interpretation of its results. As for the point contact method, serious difficulties accompany the transmission of the momentary electrical impulses across the rapidly rotating contact maker, and injury to the contacts either by mechanical wear or by sparking results in false indications of wave form.

In this art, small differences in wave form may have important metallurgical significance, and these differences may occur in the neighborhood either of the zeros or of the peaks of the wave. It is therefore essential that the analyzer be accurate and linear, and that it be so between wide amplitude limits of the quantity to which it responds. This severe requirement is not met completely by either the oscillograph or the point contact method, as above described.

In order to increase sensitivity and in order in part to circumvent the requirement last above noted, it has also been proposed to employ a differential method, wherein the secondary alternating current or voltage as affected by the specimen is balanced against a like quantity as affected by a standard magnetizable body. This may be accomplished, for example, by the use of two like pairs of windings, the primaries connected series-aiding, and the secondaries connected in series opposition, the magnetic core of the one pair comprising the specimen and that of the other comprising a standard magnetizable body. Under these circumstances the resulting wave form is that of the difference between the voltage of the secondary winding containing the specimen and that of secondary winding containing the standard. If the specimen and the standard have identical magnetic properties, the voltages will completely neutralize each other; if not, the different voltage will exist and its wave form may be determined by either the oscillograph or by the point contact method.

This differential method, however, is open to the objection that though the wave form of the standard and that of the specimen may each be of interset on its own account, neither of these wave forms may be separately determined, but only their difference. Because this difference is in general small, it is difficult to measure directly unless large currents flow in the windings or high amplification is employed. Amplification is generally preferred because large current flow results in useless consumption of energy and also in heating the magnetizable bodies to such an extent that alteration in their magnetic properties may occur, rendering any readings worthless. The expenditure of large amounts of energy in the production of worthless and indeed injurious heat is particularly objectionable when a large specimen is being compared with a standard of like size.

As a result of my investigations I have developed a method of and apparatus for magnetic analysis which substantially eliminates the aforementioned difficulties. The method of my invention, in brief, comprises producing an alternating signal voltage in a circuit, influencing said voltage by disposing a magnetizable body to be analyzed in inductive relationship with at least a portion of the circuit, introducing a bias voltage in the circuit sufficient to prevent the flow of current past a point in the circuit, reducing the bias voltage for a brief interval at corresponding instants in successive cycles of the signal voltage to permit a flow of current past said point, and determining the current flow past said point when the bias voltage is reduced. In less general terms, the method of my invention involves the introduction of the signal voltage into a circuit provided with an electronic synchronous switch which permits current to pass at corresponding instants in successive cycles of the signal voltage. The current passing at each such instant is an index of the magnitude of the signal voltage at that instant. By varying the instant at which the electronic synchronous switch permits current to pass, it is possible to produce for inspection a plurality of measurements along the entire wave of the signal voltage and thus reproduce the wave form of the signal voltage with accuracy. The impulses which tend to pass during the brief intervals when the electronic switch permits current to pass, may thus be balanced against impulses of like magnitude and opposite phase obtained from an external source of direct current, in such fashion that the impulses are neutralized before reaching an indicating means. Readings of the magnitude and phase of the impulses obtained from the external source, when plotted one against the other, give the wave form of the signal voltage, so that this phase of my operation affords the recognized advantages of "null method indication."

The apparatus of my invention, in brief, comprises means for impressing a signal voltage characteristic of a magnetizable body on the input circuit of a vacuum tube detector or the like, which is also provided with an output or plate circuit, means for biasing the vacuum tube and rendering it nonconductive except during brief corresponding intervals in successive cycles of the signal voltage, and means for determining current flow in the output circuit during the conductive intervals.

That this invention provides a simple improved method of determining with great precision the wave form of a specimen magnetizable body by the induced voltage method, and an inexpensive, rugged apparatus for carrying it out, as well as certain features which are wholly new and highly useful will be seen from the following detailed description of the operation taken in conjunction with the drawings in which:

Figure 3 illustrates how a full wave rectified voltage of proper frequency may be employed to produce the required grid bias.

Figure 4 illustrates another and preferred bias-producing voltage, formed by the addition in proper phase relation of a full wave rectified voltage of the signal frequency and a half-wave rectified voltage of the same frequency.

Figures 5a and 5b illustrate the potentials of the grids of a vacuum tube of Figure 1, resulting from the addition thereon of a voltage to be analyzed and an auxiliary biasing voltage under two different phase conditions.

Figure 6 illustrates the wave form of the current fluctuations in the detector anode circuit of the apparatus of Figure 1, in one modification.

Figure 1:
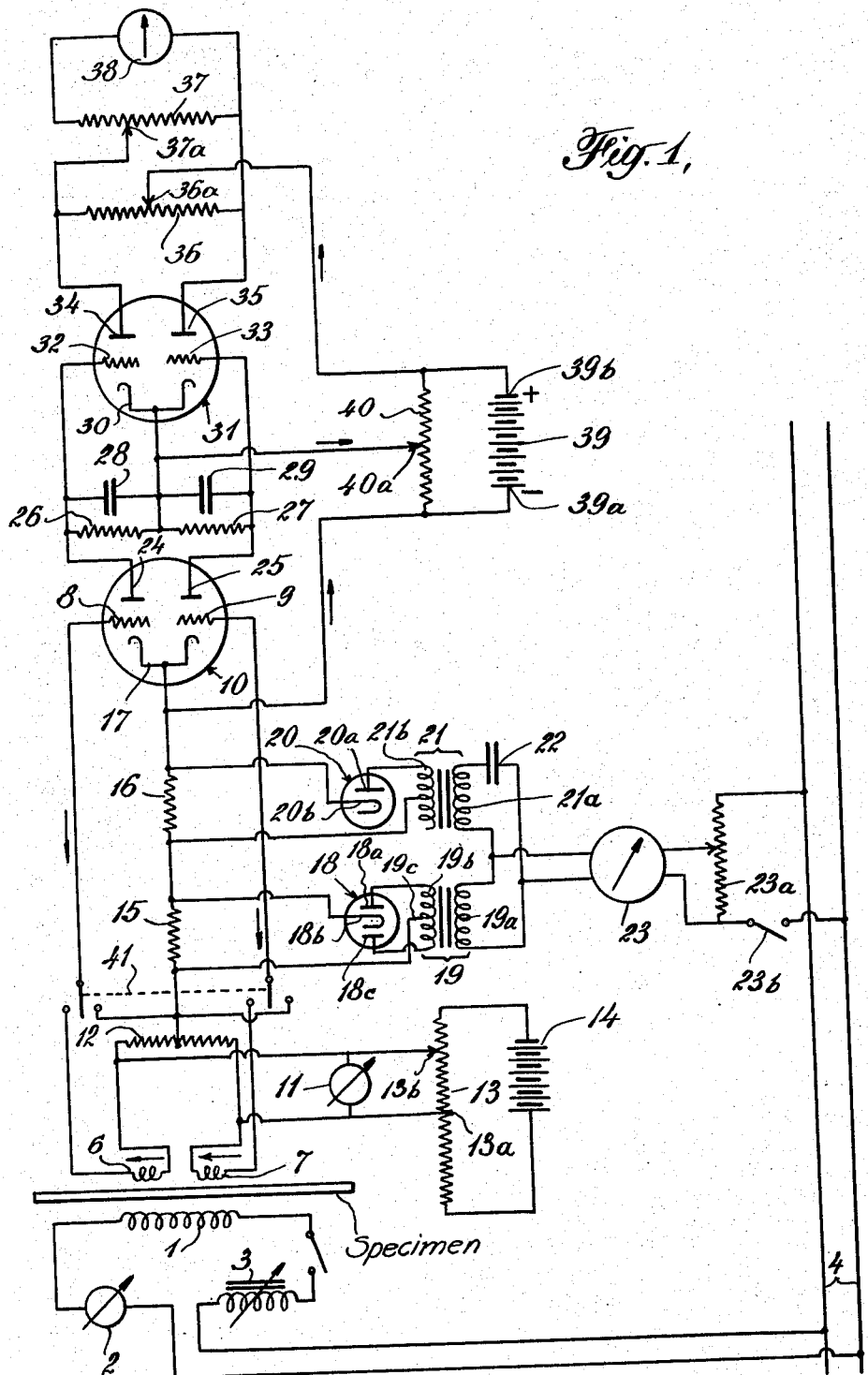
Figure 1 is a circuit diagram of a presently preferred form of the apparatus of my invention.

Referring now to Figure 1, it will be observed that a primary winding 1 is connected in series with an ammeter 2 and with a variable current-limiting reactor 3 to an alternating current supply line 4, which may conveniently be the local sixty cycle power supply line. Any current limiting device would serve the purposes of the invention in place of the reactor 3, but a reactor is preferred to a resistor because it is capable of limiting the current without excessive production of heat. The variation of the impedance of the reactor 3 is accomplished in any convenient manner, such as changing taps or inserting and removing a magnetic core.

The primary winding 1 may be of any convenient construction but is preferably a solenoid wound on an insulating tube of diameter sufficient to permit a specimen magnetizable body to be passed through it. The winding should have low ohmic resistance.

Disposed symmetrically in inductive relation to the primary winding 1 are two like secondary windings 6 and 7. These secondary windings should be carefully matched for resistance, inductance, and self-capacity. They are preferably disposed concentrically with the primary winding either inside or outside thereof.

These secondary windings 6 and 7 are connected together in series aiding through a center-tapped resistor 12. The remaining terminals of the secondary windings are connected, respectively, to a two-gang two-way switch 41.

An external source of direct current energy 14, which may be of any convenient form, is connected to a resistor 13 having a center tap 13a and a movable contact 13b. The center tap and movable contact are connected to the two ends, respectively, of the resistor 12, across which is also connected a voltmeter 11.

The center tap of the resistor 12 is connected through resistors 15 and 16 in series to twin cathodes 17 of vacuum tube 10. When the switch 41 is thrown in one direction (to the left in Figure 1) the secondary windings 6 and 7 are directly connected, respectively, to grids 8 and 9 of tube 10.

Plates 24 and 25 of tube 10 are connected together through like resistors 26 and 27. Condenser 28 is connected across resistor 26, and condenser 29 is connected across resistor 27.

An external source of direct-current energy 39 is connected to a resistor 40 having a movable contact 40a. The low potential terminal 39a of the source 39 is connected to the cathodes 17 and the movable contact 40a is connected to the common point of resistors 26 and 27.

The tube 10 is shown as a twin vacuum tube having its cathodes 17 connected together and its control grids and plates connected as above described. If desired, it may be replaced by two simple vacuum tubes, the cathodes thereof being connected together and the remaining connections being as shown in Figure 1. It may also be replaced by a tube or tubes of more complex construction, or by any form of balanced detector, as will be understood by those skilled in the art.

Grids 32 and 33 of an amplifier tube 31 are connected respectively to the plates 24 and 25 of the tube 10 and twin cathodes 30 of tube 31 are connected together and to the common point of the plate resistors 26 and 27. A resistor 36, having a movable contact 36a, is connected across plates 34 and 35 of the tube 31. The movable contact 36a is connected to the high potential end 39b of the external source 39, and the cathodes 30 are connected to the movable contact 40a. As in the case of the twin tube 10, the twin tube 31 may be replaced by any desired form of balanced amplifier.

The two terminals of a sensitive D. C. milliammeter or galvanometer 38 are connected respectively to the ends of a resistor 37 having a movable contact 37a. The movable contact 37a and one end of the resistor 37 are connected respectively to the plates 34 and 35 of the tube 31.

Across the alternating current supply line 4 are connected the input terminals of a phase shifting device 23, in series with a current limiting resistor 23a through a switch 23b. Because the phase shifting device draws but little power, a resistor is not objectionable for this purpose, although it may be replaced by a reactor if desired. This phase-shifting device may be of any desired construction but it has been found that the device commercially available under the name of a phase-shifting transformer operates satisfactorily. The output terminals of the phase-shifting device 23 are connected to a primary winding 19a of a first transformer 19 and also, through a condenser 22, to primary winding 21a of a second transformer 21. The secondary winding 19b of transformer 19 is connected to the plates 18a and 18c of a full wave rectifier tube 18. A center tap 19c of the secondary winding and a cathode 18b of the full wave rectifier tube are connected respectively to the two ends of resistor 15. One terminal of the secondary winding 21b of transformer 21 is connected to plate 20a of a half-wave rectifier tube 20 and the other terminal is connected to one end of the resistor 16. The other end of the resistor 16 is connected to cathode 20b of the tube 20.

The operation of the apparatus of Figure 1 will now be described.

If an alternating current be supplied to the primary winding 1, switch 23b being open, and the biasing system therefore inoperative, electromotive forces will be thereby induced in the secondary windings 6 and 7. The magnitude of the primary current is controlled by the variable reactor 3 and may be read on the ammeter 2.

Because the coils 6 and 7 are connected in series aiding and matched, and because the two portions of center-tapped resistor 12 are balanced, equal and opposite alternating voltages will, when the switch 41 is thrown to the left, be impressed on the grids 8 and 9. These grid voltages will respectively control the current flowing to the plates 24 and 25, and an alternating current will flow through the resistors 26 and 27 and the condensers 28 and 29 in parallel. Since the grid voltages are balanced, however, no D. C. voltage will appear across the plates 24 and 25, and therefore none will appear across the grids 32 and 33 of tube 31, but only the alternating voltage due to the coils 6 and 7 as amplified by the tube 10.

Similarly, an amplified alternating voltage will appear across the resistor 36, but if the system is balanced no direct voltage will appear across this resistor. Under these conditions, D. C. milliammeter 38 will read zero current at all times.

Adjustments for balance and sensitivity of the system should be made when the voltage induced in the coils 6 and 7 is removed from the grids 8 and 9, the latter being short-circuited by throwing switch 41 to the right, and with the grid bias voltage impressed on the grids in parallel, switch 23b being closed for this purpose.

In order to effect this adjustment, movable contact 36a should be slightly displaced. This will cause a small direct voltage to appear across resistor 36 which will be manifested by a deflection of the moving element of galvanometer 38. Movable contact 40a, which governs the plate potentials of tubes 10 and 31 should then be adjusted until this deflection is a maximum. If the deflection should be so great as to drive the moving element off scale, movable contact 36a should be further adjusted until the deflection is reduced, and adjustment of movable contact 40a repeated until conditions of greatest sensitivity of the amplifier tubes 10 and 31 are reached. Movable contact 36a should then be readjusted until, even under conditions of greatest sensitivity, the galvanometer deflection is zero. It will be noted that this position of contact 36a is not necessarily at the midpoint of resistor 36, but at such a point that it exactly compensates for all unbalance and dissymmetry in the system.

Sensitivity of the galvanometer 38 is then finally adjusted by means of movable contact 37a.

If the biasing system, including components 15 to 23 inclusive be considered or be permitted to operate, by closing switch 23b, it will be seen that a full wave rectified voltage is impressed on resistor 15. Its frequency is identical with that of the supply line 4 and therefore with that of the induced voltage in coils 6 and 7. Similarly, a half-wave rectified voltage is impressed across the resistor 16. This voltage is substantially displaced in phase from the full wave rectified voltage, due to the presence of condenser 22 in the primary circuit of transformer 21.

The phase relations of these two rectified voltages are together widely adjustable with respect to the line voltage, by means of the phase shifting device 23, and their magnitudes may be controlled by the potentiometer 23a, though, as above stated, their relative phase displacement and their relative magnitudes are fixed. The magnitude of the half-wave rectified voltage should be of the same order as that of the full wave rectified voltage, though it is by no means necessary that these magnitudes be alike. The phase of the half wave rectified voltage should be substantially displaced from that of the full wave rectified voltage though it is by no means necessary that the phase displacement be 90°.

Figure 4 shows the effect of adding together a full-wave rectified voltage and a half-wave rectified voltage substantially displaced in phase from each other. In Figure 4, curve A shows the wave form of the full wave rectified voltage and curve B that of the half wave rectified voltage. Curve B is shown as displaced substantially 90° in phase from curve A but as above stated this is not essential. The ordinates of curves A and B have been added to give curve C.

Since as above stated, the two rectified voltages A and B are placed in series by means of resistors 15 and 16 and then impressed upon the grids 8 and 9 in parallel, curve C represents the resulting potential of both the grids 8 and 9. It will be seen that this grid potential approaches a zero value sharply and for one brief interval per cycle, having a large negative value throughout the remainder of the cycle. This operates to bias both the grids 8 and 9 below cut-off during the greater part of the cycle and permits a plate current to flow only during the brief interval or at the instant at which the grids are not so biased below cut-off.

The effect of this biasing means is the same, during the intervals of interest as that of a full wave rectified voltage derived from an alternating current source having a frequency one-half that of the supply line 4. Such a full wave rectified voltage D is shown in Figure 3.

The rectifier system of Figure 1 is preferred for the reason that it provides a simple and inexpensive means of obtaining a bias voltage which shall have a large negative value except during one brief interval per cycle, without the necessity of a frequency divider, or of a second source of lower frequency.

It will be evident that the breadth of the interval during which the tube is conductive is determined by the magnitude of the rectified voltages, which can be manually controlled by the potentiometer 23a. This interval can easily be altered by adjustment of the potentiometer 23a.

Assuming that the instant of activity of the grid 8 occurs while the electromotive force induced in the coils 6 and 7 is positive with respect thereto, Figure 5a shows the actual potential of this grid 8 which results from the addition of the biasing voltage and the voltage induced in the coils 6 and 7. It will be seen that with phase relations as shown, the net grid potential is biased below cut-off for the major portion of each cycle (except when the bias curve rises to the cathode potential line). Under the same phase conditions the potential of grid 9, illustrated in Figure 5b, is biased below cathode potential at all times, since the induced voltage is negative during the brief interval at which the bias arrives at the cathode potential line.

These conditions operate to prevent a plate-current flow in the circuit of plate 25 at all times and to permit a flow of current in the circuit of plate 24 only during the said brief intervals. Thus tube 10 operates as a detector, and the wave-form of the resulting plate current is in the nature of a positive point impulse and is indicated by curve E of Figure 6. It will be clear that the magnitudes of these point impulses of plate current are directly related to the magnitude of the voltage induced in coil 6 at the particular instant at which the plate 24 is rendered conductive by reduction of the biasing voltage on grid 8. Therefore, if by adjustment of the phase-shifting device 23 the phase of the biasing voltage is shifted with respect to the induced voltage, the grid 8 will permit current to flow to plate 24 at a different instant and a positive point impulse of different magnitude will result in the circuit of plate 24. Such point impulses of altered phase and reduced magnitude are illustrated by the dotted curve F of Figure 6 obtained by shifting the biasing voltage roughly 60 degrees in phase from the position in which curve E was obtained.

When the phase of the biasing voltage is shifted 90 degrees from the position shown in Figure 5, the conductive periods of both plates occur when the induced voltage is zero, and no plate current change occurs in either plate circuit. When the shift is more than 90 degrees, the plate 25 becomes the conductive one, the plate 24 being non-conductive.

Figure 7:
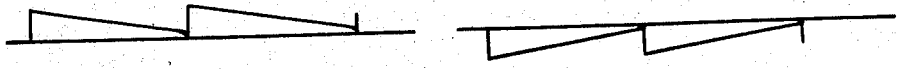
Figure 7 illustrates the wave form of the voltage fluctuations between detector anodes in the apparatus of Figure 1 in a preferred modification.

The point impulses of plate current may well be of considerable magnitude, and if the resulting voltage were impressed on the grids of tube 31 without alteration, might overload the latter, without producing correct deflection at the meter 38 due to the inability of this meter to follow the extremely short electric fluctuation. I therefore prefer to slope the plate voltage impulses off as shown in Figure 7. This is accomplished by the use of the condensers 28 and 29 connected as shown in Figure 1. The point impulses of plate current serve to charge these condensers almost instantaneously once per cycle, and they are thereafter discharged through the resistors 26 and 27 during the remainder of each cycle.

It will be seen that the voltage resulting from such repeated charging and discharging is of a saw-tooth wave form, and has a direct-current component, that is to say, an average value different from zero. This is due to the fact that the positive point impulses of current flowing to one plate of tube 10 are not neutralized by equal and opposite negative impulses flowing to the other plate; and this is due in turn to the fact that on grid 8 the induced voltage is added to the biasing voltage, whereas on grid 9 it is subtracted therefrom.

The saw-tooth voltage of Figure 7 is impressed directly between the grids 32 and 33 of the tube 31. In general, both its direct current component and its alternating current component will be amplified by the action of this tube, and the resulting amplified plate voltage impressed without alteration of wave form across the plate resistor 36. Since the galvanometer does not respond to the alternating current component, it may be preferred, in order to obtain increased sensitivity, to rectify the alternating current component, at least in part. This may be accomplished through the medium of resistors 26 and 27, since the normal plate currents of the tube 10 produce a voltage drop between cathode and each grid of tube 31. By proper choice of these resistors and of the operating potential of tube 31 this voltage drop may be adjusted to bias the grids 32 and 33 at or close to cut-off. In this event, the alternating component of the voltage across 26 and 27 will be rectified by the tube 31 and the voltage across resistor 36 will comprise this rectified voltage as well as the amplified direct component across the resistors 26 and 27.

The voltage drop across resistor 36 is impressed through the resistor 37 and the movable contact 37a on galvanometer 38 and causes a deflection of the moving element thereof.

The deflection of the galvanometer 38 may, if desired, be taken as an indication of the voltage induced in the coils 6 and 7. This galvanometer deflection will be directly proportional to such voltage if and only if tube 31 operates as a linear amplifier and tube 10 as a linear detector; and if not, the resulting wave form will be distorted. These conditions are easy to obtain over limited voltage ranges but difficult to obtain over wide ranges. Since in my particular application it is desirable that the apparatus as a whole be linear over fairly wide ranges of voltage induced in the windings 6 and 7, I prefer to employ the balancing circuit, comprising components 11 to 14, inclusive, of Figure 1, which enables me to read zeros on galvanometer 38 at all times.

The operation of this balancing circuit will now be described.

Adjustment of the position of the sliding contact 13b places a direct voltage across resistor 12. Because the sliding contact 13b may be moved from one end of resistor 13 to the other, past the center tap, this voltage may be adjusted from a fairly high value through zero to a negative value of the same magnitude. This voltage is in series with the voltage induced in the coils 6 and 7, and, when the switch 41 is thrown to the left, it is impressed between the grids 8 and 9. In view of the biasing circuit above-described, however, this grid voltage has no effect on the plate current of tube 10 except during the one brief interval per cycle in which the induced voltage also has its effect, and is therefore equivalent to an impulse of like nature. Adjustment of the sliding contact 13b either adds this voltage to the voltages already impressed on the grids 8 and 9 or subtracts it therefrom resulting in an increase or a decrease in the deflection of the galvanometer. For any setting of phase shifter 23 a position may be found for movable contact 13b such that the impulses due to source 14 and resistor 12 are exactly equal and opposite to those due to induction in coils 6 and 7. This results in reducing the galvanometer deflection to zero. Since the ordinate of the wave form under investigation is, for any phase condition, directly proportional to the magnitude of the impulse due to induction, it is also directly proportional to the magnitude of the equal and opposite impulse due to source 14 and resistor 12; and this magnitude may in turn be read on voltmeter 11. Thus, by setting phase shifter 23 successively to different positions preferably at equal phase intervals throughout a full revolution, balancing the galvanometer 38 for each such position by adjustment of movable contact 13b, and plotting the null readings of voltmeter 11 against the dial readings of phase shifter 23, the complete wave form under investigation may be obtained.

I will now described in detail the performance of a magnetic analysis according to the methods and with the apparatus of my invention.

With switch 41 thrown to the right and switch 23b closed, and with movable contact 37a set for maximum galvanometer sensitivity, I adjust contact 36a until galvanometer 38 shows a minute deflection in either direction. I then adjust contact 40a until the deflection has reached a maximum value. The operating potentials of the electrodes of tubes 10 and 31 will then be such as to result in maximum sensitivity of the apparatus as a whole.

Then, by movement only of contact 36a, I reduce the galvanometer deflection to zero. The apparatus as a whole is now balanced.

I next protect the galvanometer from a large surge by moving slider 37a to the right, close switch 23b and adjust movable contact 13b until voltmeter 11 reads zero. I then move slider 37a to the left increasing the galvanometer sensitivity, until the galvanometer needle shows a large deflection. By movement of slider 13b I reduce this deflection to zero. I then move slider 37a until the galvanometer again shows a deflection, and again reduce it to zero by adjustment of slider 13b, continuing this process until the sensitivity obtained is as great as desired. I then note the reading of the dial of phase shifter 23 and that of voltmeter 11.

The setting of phase shifter 23 is now altered, say by 5 or 10 degrees, and a new pair of readings taken. The whole process is then repeated at equal phase intervals, say of 5 or 10 degrees, until a full cycle has been investigated. If the utmost sensitivity is desired, it may be necessary to reduce the galvanometer sensitivity by moving slider 37a to the right before altering the setting of phase shifter 23. Excellent results, however, can be obtained by leaving the slider 37a at such a position that a shift of 5 or 10 degrees in the setting of phase shifter 23 will not throw the galvanometer element off scale. Under these conditions, successive readings of phase and voltage may be taken without altering the setting of slider 37a. If, then, after the full wave has been recorded and plotted, it should be desired to obtain increased accuracy as to some particular portion thereof, phase shifter 23 can be reset to the proper phase value and the slider 13b carefully adjusted to give zero deflection of the galvanometer even at full extension of the slider 37a.

It will be evident that by the use of the null method and the components 11 to 14, inclusive, non-linearities of the vacuum tubes 10 and 31 do not interfere with the accuracy of the results in the slightest degree, since when a reading is taken, both tubes are always balanced, and it is of no consequence that the balance points may occur on a curved portion of a vacuum tube characteristic.

It is due to this fact that I am enabled to take advantage of the high amplification obtainable with a slightly positive grid. As above explained, the voltage on one of the grids of the tube 10 will rise above zero by the amount of the voltage induced in the corresponding coil, once per cycle; and the voltage of one of the grids of the tube 31 will rise above its normal operating value in the same way by a greater amount due to amplification. This will result in a greater amplification factor for each tube than would exist were it biased exactly at cut-off.

It must be borne in mind, however, that a fundamental requirement for successful operation of the device is that the tube 10 act as a detector. If too great a degree of amplification is sought to be obtained from tube 10, this may be at the expense of its detector efficiency. It may therefore be advisable in some cases to provide the grids 8 and 9 with a fixed bias in order that the tube shall operate at or near cut-off. This fixed grid bias may easily be obtained by inserting a small battery in series between the cathodes 17 and the resistor 16 of Figure 1. I have found, however, that the apparatus operates excellently without the assistance of this bias and it has therefore been omitted from the drawings.

An additional matter of importance in connection with the circuit arrangement of Figure 1 is the highly desirable sensitivity characteristic which results from the connections of the tubes 10 and 31. It will be seen that the greater the impulsive voltage on grid 8, and, therefore, the greater the voltage drop across resistors 26 and 27, the greater will be the negative bias of grid 32. This results in reducing the amplification factor of the tube 31 in proportion as the signal on it is increased. The same, of course, is true as regards grid 9 and grid 33. This provides an extremely wide range for the apparatus as a whole and also serves to protect the galvanometer from large surges without in any way reducing its sensitivity to the minute signals which exist when the null method is employed.

My experience with the circuit arrangement of Figure 1 has indicated that for many purposes continuous adjustment of the phase of the biasing voltage is not necessary and that, particularly on production test work, satisfactory results may be obtained by using only a few fixed phase points. In such case, the phase shifting arrangement of Figure 1 may be replaced by a different arrangement such, for example, as that shown in Figure 2, which is identical with the circuit section 15 to 22, inclusive, of Figure 1 with the following exceptions: Phase shifter 23 is eliminated, and the input leads of transformers 19 and 21 are connected to a two-pole three-position switch 43 which connects these two transformers, through the potentiometer 23a, either directly to supply line 4, or to a secondary 44 of primary winding 1, or to a secondary winding 45 of choke coil 3. In addition, both of the rectifier tubes 18 and 20 are of the full wave type, and a two-pole double-throw switch 42 is provided which may be used to disconnect one of the two plates of each rectifier tube alternatively from its corresponding transformer, thereby producing either full wave or half wave rectified voltages across either resistor 15 or resistor 16. The effect of this switching operation is to shift the point impulse by 90°. These two switches together, therefore, give six points at which the voltage induced in coils 6 and 7 may be investigated.

Figure 2:
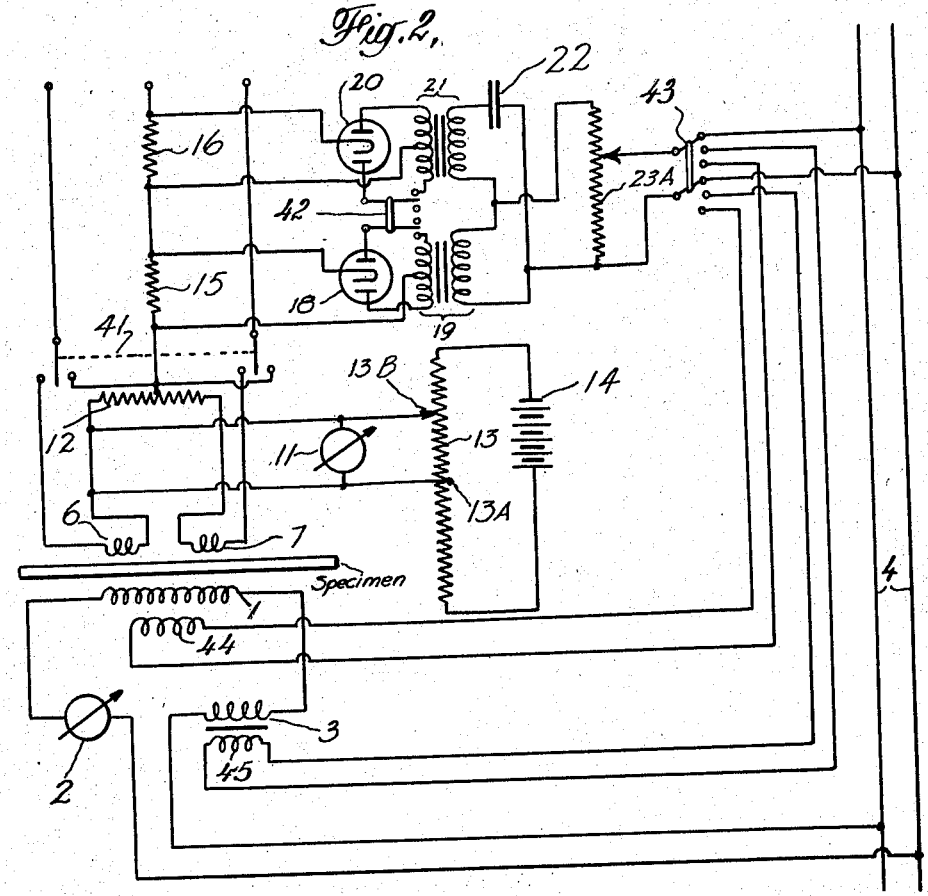
Figure 2 is a circuit diagram showing a modification of the apparatus of Figure 1 with respect to the means employed for shifting the phase of the auxiliary biasing voltage.

When using the circuit arrangement of my invention, particularly in the preferred form of Figure 1, the wave form of the voltage induced in coils 6 and 7 due to the presence within the windings of the specimen magnetizable body under test is directly obtained. This may be compared in the laboratory with the wave form due to a standard specimen of like size and shape, and the differences noted. If preferred, and it is for this second purpose that the modification of Figure 2 is particularly adapted, production stock may be run through the solenoid, the phase shifter being set at some position earlier determined to be critical. An unskilled operator may adjust the movable contact 13b and note the readings of galvanometer 38 and pass or reject the stock in terms of these readings.

Having now described my invention, I claim:

1. In a method of magnetic analysis which involves the production of an alternating signal voltage in a circuit influenced by a magnetizable body to be analyzed, the improvement which comprises introducing a bias voltage in the circuit sufficient to prevent the flow of current past a point in said circuit, reducing said bias voltage for a brief interval at corresponding instants in successive cycles of the signal voltage to permit a flow of current past said point, and determining the current flow past said point in said circuit when said bias voltage is reduced.

2. In a method of magnetic analysis which involves the induction of a signal voltage in a circuit influenced by a magnetizable body to be analyzed and observing a current flow in said circuit, the improvement which comprises introducing into the circuit a bias voltage sufficient to prevent the flow of current past a point in said circuit, reducing said bias voltage for a brief interval at corresponding instants in successive cycles of the signal voltage and determining the current flow past the point in said circuit when said bias voltage is reduced.

3. In a method of magnetic analysis which involves the production of an alternating signal voltage in a circuit influenced by a magnetizable body to be analyzed disposed in inductive relationship with the circuit, the improvement which comprises introducing into the circuit a rectified alternating bias voltage having a maximum amplitude sufficient to prevent the flow of current past a point in the circuit and a minimum amplitude such that current is permitted to flow past said point, and determining the flow of current past said point when the bias voltage is at its minimum.

4. A method of magnetic analysis according to claim 3 in which the bias voltage is obtained by full-wave rectification of an alternating current having a frequency half that of the signal voltage.

5. A method of magnetic analysis according to claim 3 in which the bias voltage is obtained by full-wave rectification of an alternating voltage having a frequency equal to that of the signal, half-wave rectification of an alternating voltage of the same frequency, and addition of said rectified voltages substantially out of phase with each other.

6. A method of magnetic analysis according to claim 3 in which the bias voltage is the sum of a full-wave rectified voltage and a half-wave rectified voltage of the same sign but displaced in phase from each other.

7. In a method of magnetic analysis involving the production in a circuit of an alternating signal voltage inductively influenced by a magnetizable body to be analyzed, the improvement which comprises introducing into the circuit a bias voltage of constant sign but varying magnitude, causing the bias voltage to be of sufficient magnitude during all but brief corresponding intervals of successive cycles of the signal voltage to prevent a flow of current past a point of said circuit, balancing the signal voltage during said intervals by introducing an auxiliary D. C. voltage into the circuit, and measuring the D. C. voltage thus introduced.

8. In a method of magnetic analysis involving the production in a circuit of an alternating signal voltage inductively influenced by a magnetizable body to be analyzed, the improvement which comprises introducing into the circuit a bias voltage of varying magnitude such that current is prevented from passing a point in the circuit except during brief corresponding intervals in successive cycles of the signal voltage, determining the current flow past the point during said brief intervals, shifting the phase of the bias voltage with respect to the signal voltage to obtain new brief intervals, and thereafter determining the current flow past the point during said new brief intervals.

9. In a method of magnetic analysis involving the production in a circuit of an alternating signal voltage inductively influenced by a magnetizable body to be analyzed, the improvement which comprises simultaneously introducing into said circuit a bias voltage of constant sign but varying magnitude, maintaining the magnitude of the bias voltage sufficiently high to prevent the passage of current past a point in said circuit except during brief corresponding intervals in successive cycles of the signal voltage, determining the flow of current past said point during said brief intervals, introducing into the circuit an auxiliary voltage in amount sufficient to balance the signal voltage during said brief intervals and determining the magnitude of the auxiliary voltage thus introduced.

10. In a method of magnetic analysis involving the production in a circuit of an alternating signal voltage inductively influenced by a magnetizable body to be analyzed, the improvement which comprises simultaneously introducing into said circuit a bias voltage of constant sign but varying magnitude, maintaining the magnitude of the bias voltage sufficiently high to prevent the passage of current past a point in said circuit except during brief corresponding intervals in successive cycles of the signal voltage, determining the flow of current past said point during said brief intervals, introducing into the circuit an auxiliary voltage in amount sufficient to balance the signal voltage during said brief intervals, determining the magnitude of the auxiliary voltage thus introduced, shifting the phase of the bias voltage with respect to the signal voltage to obtain new brief intervals, altering the magnitude of the said auxiliary voltage to balance the signal voltage during said new brief intervals, and determining the magnitude of the auxiliary potential as altered.

11. In a magnetic analysis apparatus having a winding disposable in inductive relationship to a magnetizable body, a first circuit connected to said winding and means for inducing in said winding a signal voltage characteristic of physical properties of the magnetizable body, the improvement which comprises a vacuum tube detector having its input side connected to said first circuit and provided with an output circuit, means for impressing on said detector tube a bias voltage of magnitude such that the tube is rendered nonconductive except during brief corresponding intervals in successive cycles of the signal voltage, and means for measuring the output of the tube during said intervals.

12. Apparatus according to claim 11 provided with means for shifting the phase of the bias voltage with respect to the signal voltage.

13. Apparatus according to claim 11 provided with means for introducing an auxiliary direct current voltage in the first circuit to balance the signal voltage during the intervals in which the tube is conductive, and means for measuring the auxiliary voltage thus introduced.

14. In a magnetic analysis apparatus having a first circuit and means for introducing into the circuit a signal voltage characteristic of a magnetizable body undergoing analysis, the improvement which comprises a vacuum tube detector provided with a cathode and a grid connected to the first circuit and a plate connected to an output circuit, means for producing and introducing into the first circuit a bias voltage sufficient to render the tube nonconductive except during brief corresponding intervals in successive cycles of the signal voltage, and means for determining the plate current output during the intervals when the tube is conductive.

15. Apparatus according to claim 14 provided with an amplifier in the output circuit.

16. Apparatus according to claim 14 in which the means for producing the bias voltage comprises a full-wave rectifier tube and a half-wave rectifier tube coupled on their input sides through phase displacing means.

17. Apparatus according to claim 14 provided with means for introducing an auxiliary direct current voltage into the first circuit to balance the signal voltage during the intervals in which the tube is conductive, and means for regulating the magnitude and sign of said auxiliary voltage.

18. Apparatus according to claim 14 provided with means for shifting the phase of the bias voltage with respect to the signal voltage and means for measuring the magnitude of the phase shift.

19. In a method of magnetic analysis which involves the production of a signal voltage in a first circuit influenced by a magnetizable body to be analyzed, the improvement which comprises introducing a first auxiliary alternating voltage in said first circuit, said auxiliary voltage having a sharp-peaked wave form, a frequency equal to said signal frequency, and a certain phase, combining said signal voltage with said auxiliary voltage, rectifying said combined voltages to provide a first impulsive voltage in a second circuit, the impulses of said impulsive voltage being related to the magnitude of said signal voltage at the phase of said auxiliary voltage, introducing a second auxiliary direct current voltage in said first circuit, combining said second auxiliary voltage with said first auxiliary voltage to provide a second impulsive voltage in said second circuit, and adjusting the phase of said first auxiliary voltage and the magnitude of said second auxiliary voltage to balance said first impulsive voltage against said second impulsive voltage.

20. In apparatus for the magnetic analysis of a magnetizable body by determination of the wave-form of a secondary signal voltage induced through the medium of said magnetizable body in a first circuit by a primary current flowing in a primary circuit, said wave-form being characteristic of the properties of said magnetizable body, the combination of a full-wave rectifier and a half-wave rectifier having input terminals connected in the primary circuit and output terminals connected in the first circuit, a source of auxiliary direct current voltage, connected to said first circuit, a second circuit, a detector having input terminals connected to said first circuit and output terminals connected to said second circuit, indicating means responsive to direct current in said second circuit, means for combining the output voltages of said rectifiers to provide a first auxiliary alternating voltage in said first circuit having a sharp-peaked wave-form and a certain phase, means for biasing said detector in related accordance with said first auxiliary voltage, means for combining said signal voltage with said auxiliary direct current voltage in said first circuit, means for shifting the phase of said first auxiliary alternating voltage, and means for regulating the magnitude and sign of said auxiliary direct current voltage.

21. In an apparatus for the magnetic analysis of a magnetizable body by determination of the wave-form of an alternating signal voltage in a first circuit, influenced by the presence of said body disposed in inductive relation with said first circuit, the combination which comprises a detector having input terminals connected in said first circuit and output terminals, a second circuit connected to the output terminals of said detector, means for impressing said signal voltage on the input terminals of said detector, means for producing auxiliary alternating voltage of sharp-peaked wave-form and of frequency equal to that of said signal voltage, and of a certain phase, means for biasing said detector in related accordance with said auxiliary voltage, means for maintaining a constant average difference of potential between the input terminals of said rectifier, and means responsive to direct current in said second circuit for indicating instantaneous balance between said signal voltage and said difference of potential.

THEODOR ZUSCHLAG.